United States Patent
van Rietschote et al.

(10) Patent No.: US 7,822,827 B2
(45) Date of Patent: Oct. 26, 2010

(54) CONTINUOUS DATA PROTECTION AND REMOTE BLOCK-LEVEL STORAGE FOR A DATA VOLUME

(75) Inventors: Hans F. van Rietschote, Sunnyvale, CA (US); Tommi Salli, Mountain View, CA (US)

(73) Assignee: Symantec Corporation, Cupertino, CA (US)

(*) Notice: Subject to any disclaimer, the term of this patent is extended or adjusted under 35 U.S.C. 154(b) by 198 days.

(21) Appl. No.: 12/164,194

(22) Filed: Jun. 30, 2008
(Under 37 CFR 1.47)

(65) Prior Publication Data

US 2009/0327445 A1    Dec. 31, 2009

(51) Int. Cl.
G06F 15/16    (2006.01)

(52) U.S. Cl. ............... 709/217; 709/213; 709/248; 711/162; 707/999.202

(58) Field of Classification Search ......... 709/212–216, 709/248, 217; 711/162; 707/999.202
See application file for complete search history.

(56) References Cited

U.S. PATENT DOCUMENTS

| | | | |
|---|---|---|---|
| 7,487,219 B1 | 2/2009 | Jia | |
| 7,631,159 B1* | 12/2009 | Krishnamurthy | 711/162 |
| 7,647,360 B2 | 1/2010 | Kano | |
| 7,650,533 B1 | 1/2010 | Saxena | |
| 7,653,800 B2 | 1/2010 | Zohar | |
| 7,680,834 B1 | 3/2010 | Sim-Tang | |
| 7,689,597 B1 | 3/2010 | Bingham | |
| 2007/0220309 A1* | 9/2007 | Andre et al. | 714/6 |
| 2007/0276878 A1* | 11/2007 | Zheng et al. | 707/202 |
| 2008/0028144 A1* | 1/2008 | Sutoh et al. | 711/114 |
| 2008/0040402 A1* | 2/2008 | Judd | 707/203 |
| 2009/0182784 A1* | 7/2009 | Rohit et al. | 707/202 |
| 2009/0182959 A1* | 7/2009 | Rao | 711/159 |

(Continued)

FOREIGN PATENT DOCUMENTS

WO    2007127361    11/2007

(Continued)

OTHER PUBLICATIONS

Silva; "Continuous Backup for Exchange Server with DPM 2007 (Part 1)"; MSExchange.org; Feb. 14, 2008; http://www.msexchange.org/articles_tutorials/exchange-server-2007/monitoring-operations/continuous-backup-exchange-server-dpm-2007-part1.html?printversion.

(Continued)

*Primary Examiner*—Salad Abdullahi
(74) *Attorney, Agent, or Firm*—Meyertons, Hood, Kivlin, Kowert & Goetzel, P.C.

(57) ABSTRACT

A system and method for writing and reading blocks of a data volume are disclosed. The method provides continuous data protection (CDP) for a data volume by backing up blocks of the data volume in real time to a local CDP log and transmitting the blocks over the Internet for storage in a remote CDP log on a server computer system in response to write requests that change the blocks of the data volume. In response to a read request for a particular block the method attempts to read the block from the data volume. If the block is not present in the data volume the method attempts to read the block from the local CDP log. If the block is not present in the local CDP log the method request the server computer system to read the block from the remote CDP log and return the block.

15 Claims, 6 Drawing Sheets

U.S. PATENT DOCUMENTS

2009/0327357 A1* 12/2009 Beglin et al. ................ 707/202

OTHER PUBLICATIONS

Bem, et al; "Computer Forensic Analysis in a Virtual Environment"; International Journal of Digital Evidence, Fall 2007, vol. 6, Issue 2; https://www.utica.edu/academic/institutes/ecii/publications/articles/1C349F35-C73B-DB8A-926F9F46623A1842.pdf.

"A Guide to Understanding Veritas Volume Replicator," Veritas Software Corp., Whitepaper, 2002.

* cited by examiner

CONTINUOUS DATA PROTECTION AND REMOTE BLOCK-LEVEL STORAGE FOR A DATA VOLUME

BACKGROUND OF THE INVENTION

1. Field of the Invention

This invention relates to reading and writing blocks of a data volume. More particularly, the invention relates to a system and method for providing continuous data protection (CDP) for a data volume by backing up blocks of the data volume in real time to a local CDP log and transmitting the blocks over the Internet for storage in a remote CDP log on a server computer system in response to write requests that change the blocks of the data volume.

2. Description of the Related Art

Computer systems often employ backup solutions to backup data in order to protect it against hardware failure or data corruption. Some backup solutions work by periodically performing backups at scheduled time intervals. For example, the data may be backed up daily or weekly. If the backup data is needed then the user can select one of the backup images that were created, and the data it contains can be restored to the computer system.

One problem with performing periodic backups in this manner is that any data that was changed since the time the most recent backup was performed will be lost in the event of a disk failure or other disaster. Also, in some cases the user may need the ability to restore the data to a particular point in time with more specificity than allowed by the time intervals at which the backups are performed. For example, the backup software may perform daily backups, but the user may need to restore the data to the state as it existed at a particular time within a certain day.

These problems have been addressed by backup and restore software which provides continuous data protection (CDP). In a CDP solution there are no backup schedules. Instead, the data is continuously backed up in real time as the data is changed. For example, continuous data protection may be provided for a data volume at the block level. Each time a block in the volume is changed, a copy of the block may be copied into a CDP log, along with a timestamp indicating the current time. Thus, for any given block in the volume, there may be multiple copies of the block in the CDP log, where each copy corresponds to one of the times when the block was changed. Since the data is continuously backed up, the CDP log can be used to restore the volume to its state as it existed at virtually any specified point in time by using the timestamp information in the CDP log to find the appropriate copy of each respective block of the volume, e.g., the copy which represents the state of the respective block at the specified point in time.

SUMMARY

Various embodiments of a system and method for reading and/or writing blocks of a data volume are disclosed herein. According to one embodiment of the method, a first request to read a particular block of the data volume may be received. In response to the first request, the method may operate to attempt to read the particular block from the data volume. In response to determining that the particular block is not present in the data volume, the method may operate to attempt to read the particular block from a first continuous data protection (CDP) log for the data volume. In response to determining that the particular block is not present in the first CDP log, a second request for the particular block may be sent over a network to a server computer system. The particular block may then be received from the server computer system.

A further embodiment of the method may comprise receiving a third request to write the particular block to the data volume. In response to the third request, the particular block may be stored in the data volume. The particular block may also be stored in the first CDP log for the data volume. The particular block may also be transmitted over the network for storage on the server computer system.

According to one particular embodiment, the system may include a first computer system and a second computer system. The first computer system and the second computer system may each be coupled to a server computer system. The first computer system may be configured to receive a write request to write a particular block to a data volume. In response to the write request, the first computer system may store the particular block in a first copy of the data volume. The first computer system may also store the particular block in a first continuous data protection (CDP) log for the first copy of the data volume. The first computer system may also transmit the particular block over a network for storage on the server computer system.

The second computer system may be configured to receive a read request to read the particular block of the data volume. In response to the read request, the second computer system may attempt to read the particular block from a second copy of the data volume. In response to determining that the particular block is not present in the second copy of the data volume, the second computer system may attempt to read the particular block from a second CDP log for the second copy of the data volume. In response to determining that the particular block is not present in the second CDP log, the second computer system may send a request for the particular block to the server computer system. The second computer system may then receive the particular block from the server computer system.

BRIEF DESCRIPTION OF THE DRAWINGS

A better understanding of the invention can be obtained when the following detailed description is considered in conjunction with the following drawings, in which.

Figure 1:
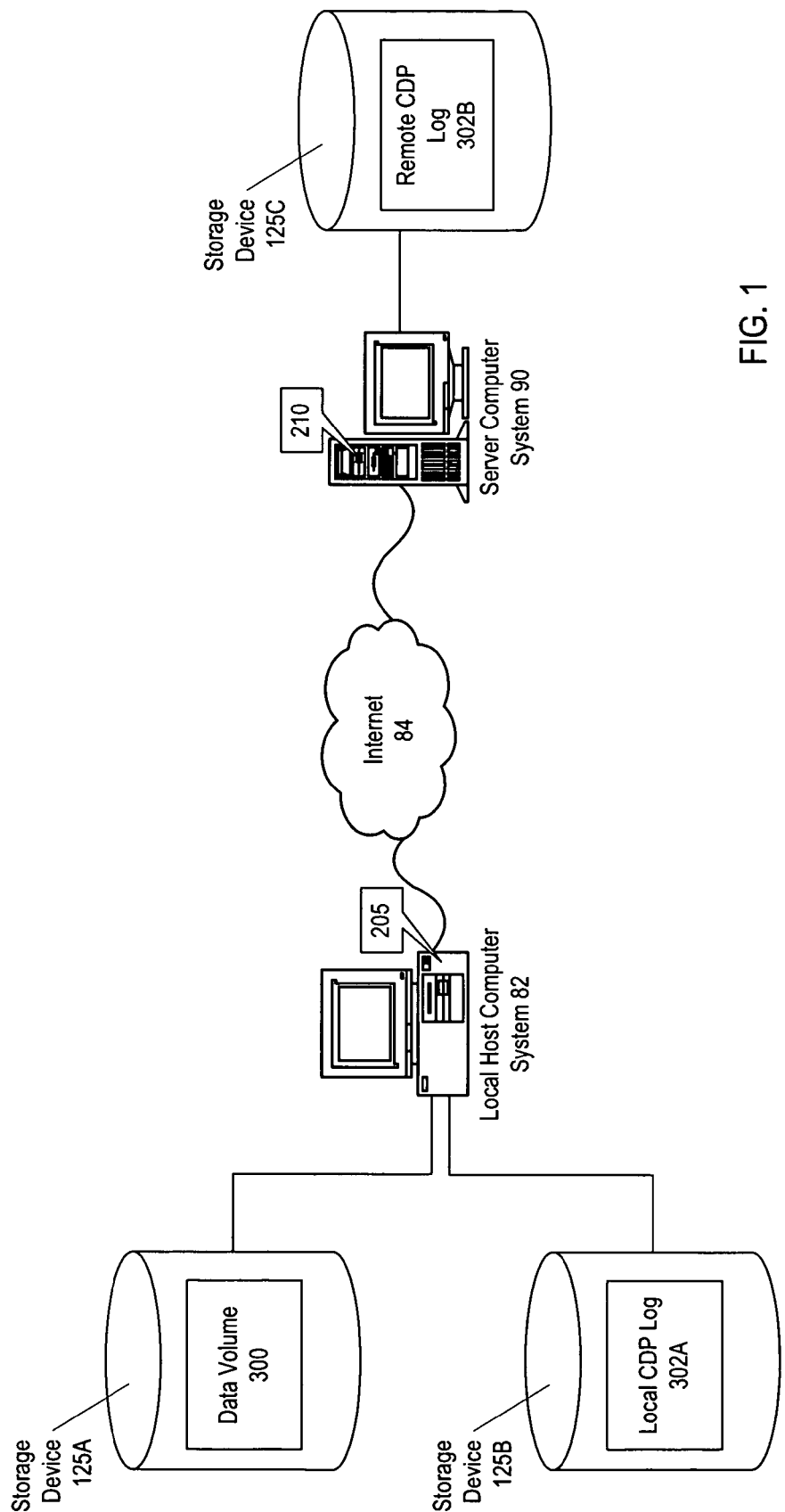
FIG. 1 illustrates one embodiment of a system for reading and writing blocks of a data volume.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for reading and writing blocks of a data volume are disclosed herein. FIG. 1 illustrates one embodiment of the system. The system includes a local host computer system 82 which manages a data volume 300. The data volume 300 is stored on one or more storage devices, such as one or more storage devices 125A. In various embodiments, the storage device(s) 125A may be coupled to the local host computer system 82 in any of various ways, as described below with reference to FIG. 5.

The data volume 300 corresponds to a partitioning and/or aggregation of physical storage provided by one or more storage devices including, but not limited to, single storage devices (e.g., disk drives), storage systems such as RAID (Redundant Array of Independent Disks) systems, disk arrays, JBODs (Just a Bunch Of Disks, used to refer to disks that are not configured according to RAID), tape devices, and optical storage devices. The data volume 300 may be formed from a portion of the overall storage of a physical device, from the storage of an entire physical device, or from the storage of multiple physical storage devices combined. The data volume 300 includes a plurality of units of data called blocks. In some embodiments the blocks may be equally sized. In various embodiments the blocks may have any size, e.g., may include any number of bytes.

The data volume 300 may be created and managed by software executing on the local host computer system 82, referred to herein as volume management and backup software 205. In particular, the volume management and backup software 205 may handle read and write requests received from applications executing on the local host computer system 82 in order to read blocks from and write blocks to the data volume 300. For example, in response to a write request to write one or more blocks, the volume management and backup software 205 may write the specified block(s) to the data volume 300. Similarly, in response to a read request to read one or more blocks from the data volume 300, the volume management and backup software 205 may read the specified block(s) from the data volume 300.

In addition, the volume management and backup software 205 may also create and maintain a local continuous data protection (CDP) log 302A for the data volume 300. The local CDP log 302A includes block-level information useable to restore the data volume 300 to a specified point in time. The volume management and backup software 205 may use any conventional CDP techniques known in the art to store information in the local CDP log 302A. In particular, the volume management and backup software 205 may store change information in the local CDP log 302A indicating changes to blocks in the data volume 300, where the change information is stored in the local CDP log 302A in real time as the blocks are changed. For example, each time the volume management and backup software 205 writes to a block of the data volume 300, the volume management and backup software 205 may copy the new data for the block into the local CDP log 302A. The volume management and backup software 205 may also store a timestamp in the local CDP log 302A indicating the time at which the block was changed. The block data and timestamp information may be stored in the local CDP log 302A in real time in response to the write request, e.g., such that the block data and timestamp information is stored in the local CDP log 302A immediately after or very soon after the block data is stored in the data volume 300.

Thus, in some embodiments, if a failure of the data volume 300 occurs, the information in the local CDP log 302A may be used to restore the data volume 300 to its state as it existed at the moment just prior to the failure. The information in the local CDP log 302A may also be used to restore the data volume 300 to its state as it existed at a specified point in time in the past. For example, even if there are no errors in the data volume 300, it may be desirable to restore the data volume 300 to a previous time point, e.g., for data mining or other purposes.

Each time a block of the data volume 300 is changed, a new copy of the block corresponding to the change may be added to the local CDP log 302A, along with a timestamp indicating the current time. Thus, for any given block in the data volume 300, there may be multiple copies of the block in the local CDP log 302A, where each copy corresponds to one of the times when the block was changed. In a restore operation, a user may specify a desired time, and the volume management and backup software 205 may use the timestamp information stored in the local CDP log 302A to restore the data volume 300 to its state as it existed at the specified time, e.g., by using the timestamp information to select the appropriate copies of each block of the data volume 300 from the local CDP log 302A.

In some embodiments the local CDP log 302A may be stored on a different storage device than the data volume 300. For example, in FIG. 1 the data volume 300 is stored on the storage device 125A, and the local CDP log 302A is stored on the storage device 125B. Storing the local CDP log 302A on a different storage device than the data volume 300 may provide greater protection for the data volume 300, e.g., in the event of a failure of the storage device 125A.

In addition to storing the block-level change information for the data volume 300 in the local CDP log 302A, the volume management and backup software 205 may also transmit the change information (e.g., the block data and timestamp) to a server computer system 90 which is coupled to the local host computer system 82 through a network 84. In some embodiments the server computer system 90 may be coupled to the local host computer system 82 through the Internet, and the change information may be transmitted over the Internet.

Thus, for each change that occurs to a block in the data volume 300, the volume management and backup software 205 may store the new block data and the timestamp information in the local CDP log 302A, and may also transmit the new block data and timestamp information over the Internet to the server computer system 90. The server computer system 90 may execute remote storage software 210 operable to store the new block data and timestamp information in a remote CDP log 302B. For example, the remote CDP log 302B may be stored on one or more storage devices included in or coupled to the server computer system 90, such as the storage device 125C.

Figure 2:
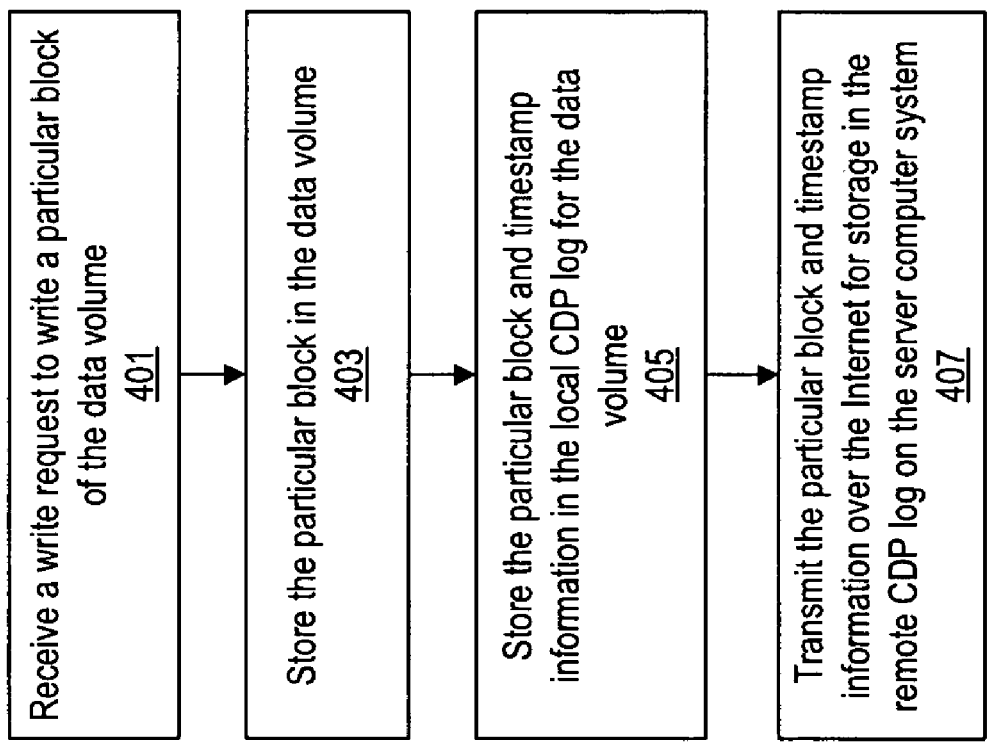
FIG. 2 is a flowchart diagram illustrating one embodiment of a method for writing to the data volume.

FIG. 2 is a flowchart diagram illustrating one embodiment of a method for writing to the data volume 300. The method of FIG. 2 may be implemented by the volume management and backup software 205 executing on the local host computer system 82. As indicated in block 401, the volume management and backup software 205 may receive a write request to write a particular block of the data volume 300. For example, the volume management and backup software 205 may receive the request from a client application program executing on the local host computer system 82. As indicated in block 403, the volume management and backup software 205 may store the particular block in the data volume 300.

The volume management and backup software 205 may also store the particular block and timestamp information in the local CDP log 302A for the data volume 300, as indicated in block 405. In some embodiments the particular block and the timestamp information may be stored in the local CDP log 302A synchronously with respect to storing the particular block in the data volume 300. For example, in some embodiments, in order for the volume management and backup software 205 to return an indication to the client application that the write request was completed, the volume management and backup software 205 may wait until both the particular block has been successfully stored in the data volume 300, and also successfully stored in the local CDP log 302A along with the timestamp information.

In other embodiments the particular block and the timestamp information may be stored in the local CDP log 302A asynchronously with respect to storing the particular block in the data volume 300. For example, in some embodiments, the volume management and backup software 205 may return an indication to the client application that the write request was completed as soon as determining that the particular block has been successfully stored in the data volume 300, but without necessarily waiting until the particular block has also been stored in the local CDP log 302A. Instead, a write request to store the particular block and the timestamp information in the local CDP log 302A may be performed asynchronously. However, the write request to store the information in the local CDP log 302A is preferably performed in real time in response to receiving the original write request from the client application, e.g., in order to provide continuous data protection for the data volume 300. For example, the write operation to update the local CDP log 302A may be performed in parallel with or immediately after the write operation to update the data volume 300. For example, one process of the volume management and backup software 205 may place the block data and timestamp information in a queue. Another process of the volume management and backup software 205 may execute in parallel with or in a multitasking fashion with respect to the first process, and may continuously check for information in the queue that needs to be written into the local CDP log 302A.

As indicated in block 407, the volume management and backup software 205 may also transmit the particular block and the timestamp information over the Internet for storage in the remote CDP log 302B on the server computer system 90. The server computer system 90 may execute remote storage software 210 operable to receive the particular block and the timestamp information and store them in the remote CDP log 302B.

In some embodiments the local host computer system 82 may encrypt the data before sending it to the server computer system 90. In some embodiments, only the block data may be encrypted so that the server computer system 90 can still read the timestamp information. Thus, at least some of the data received from the local host computer system 82 may be stored on the server computer system 90 in the encrypted form and subsequently returned to the local host computer system 82 in the encrypted form (if the local host computer system 82 subsequently requests to read the data, as discussed below). In other embodiments the local host computer system 82 may send unencrypted data to the server computer system 90, and the server computer system 90 may encrypt the data before storing it. If the local host computer system 82 subsequently requests the data to be returned, the server computer system 90 may retrieve the data and decrypt it before returning it to the local host computer system 82.

In some embodiments the volume management and backup software 205 may also transmit other information to the server computer system 90 in addition to the particular block and the timestamp information. For example, the volume management and backup software 205 may also transmit identification information and authentication information for identifying the local host computer system 82 (or a user of the local host computer system 82) to the server computer system 90 and authenticating the information to be stored on the server computer system 90. As another example, an ID or other information identifying the data volume 300 may be transmitted to the server computer system 90. For example, the server computer system 90 may be configured to provide remote storage services for storing CDP data for different data volumes on different local host computers. Thus, the server computer system 90 may maintain a respective remote CDP log for each of the data volumes and may use the identification information and authentication information received from the local host computer 82 to determine the appropriate remote CDP log in which to store the particular block and the timestamp information transmitted in block 407.

In some embodiments the local host computer system 82 may digitally sign the data before sending it to the server computer system 90, e.g., using the private encryption key of a public/private encryption key pair. The local host computer system 82 may provide the corresponding public key to the server computer system 90 so that the server computer system 90 can use it to authenticate the data and verify that it originated from the local host computer system 82. Similarly, the server computer system 90 may provide the local host computer system 82 with the public key of its own public/private encryption key pair, which the local host computer system 82 can use to authenticate data received from the server computer system 90.

In various embodiments the timing of the network transmission operation indicated in block 407 may occur in various ways with respect to the timing of the storage operations indicated in blocks 403 and 405. As described above, the storage of the change information in the local CDP log 302A may occur either synchronously or asynchronously with respect to changing the data volume 300, and preferably occurs in a continuous manner, e.g., such that change information for a particular block is stored in the local CDP log 302A in real time in response to receiving a write request from the client application to write to the particular block. In some embodiments the transmission of the change information to the server computer system 90 may also occur in a real-time or continuous manner with respect to changing the data volume 300. The transmission of the change information to the server computer system 90 may occur either synchronously or asynchronously with respect to changing the data volume 300, and may also occur either synchronously or asynchronously with respect to storing the change information in the local CDP log 302A.

In particular, in some embodiments the change information may be transmitted to the server computer system 90 synchronously with respect to the storing the change information in the local CDP log 302A. For example, the storing of the change information in the local CDP log 302A and the transmission of the change information to the server computer system 90 may be considered as a synchronized or compound operation such that both of these operations must complete before the compound operation completes. For example, while one process is storing the change information in the local CDP log 302A, another process may execute in parallel with or in a multitasking fashion with respect to the first process to transmit the change information to the server computer system 90. The first process may complete the storing of the change information in the local CDP log 302A first, but the volume management and backup software 205 may wait until receiving an acknowledgement message from the server computer system 90 indicating that the change information was received before indicating completion of the compound operation. In some embodiments this compound operation may also be performed synchronously with respect to updating the particular block in the data volume 300, or in other embodiments may be performed asynchronously, similarly as described above.

In other embodiments the change information may be transmitted to the server computer system 90 asynchronously with respect to storing the change information in the local CDP log 302A, where the change information is stored in the local CDP log 302A either synchronously or asynchronously with respect to updating the particular block in the data volume 300. For example, in some embodiments, when a first process of the volume management and backup software 205 receives the request from the client application to write the particular data block, the first process may write the particular block to the data volume 300 and may also place the particular block and the timestamp information in two queues. A second process may asynchronously read the particular block and the timestamp information from one of the queues and write them to the local CDP log 302A. A third process may asynchronously read the particular block and the timestamp information from the other queue and transmit them to the server computer system 90 for storage in the remote CDP log 302B. Thus, the storing of the change information (i.e., the block data and the timestamp information) in the local CDP log 302A and the transmission of the change information to the server computer system 90 may occur asynchronously both with respect to each other and with respect to the storing of the particular block in the data volume 300. However, these operations may still occur in a continuous manner, e.g., in real time in response to receiving the write request from the client application. For example, the second process and the third process may both execute to continuously check for new items to process in their respective queues, or may be immediately notified when new items are placed in their respective queues.

In other embodiments the block data and timestamp information may not be transmitted to the server computer system 90 in real time in response to each write request received from the client application, but may instead be transmitted on a periodic basis. For example, in some embodiments, change information may be transmitted to the server computer system 90 at timed intervals. At each time interval, the change information for all of the blocks that have changed since the previous transmission may be transmitted to the server computer system 90. Thus, in some embodiments, change information may be periodically transmitted to the server computer system 90. In some embodiments this may be implemented by periodically creating incremental snapshots of the CDP log 302B and transmitting the incremental snapshots to the server computer system 90. In various embodiments the volume management and backup software 205 may periodically transmit change information to the server computer system 90 according to any desired time schedule, e.g., once per second, once per minute, once per hour, etc.

As described above, change information specifying each block update and the timestamp information for the update may be stored in the local CDP log 302A on the host computer system 82A, and may also be transmitted to the server computer system 90 for storage in the remote CDP log 302B. Thus, in some embodiments the remote CDP log 302B on the server computer system 90 may contain the same information as the local CDP log 302A on the local host computer system 82, e.g., the remote CDP log 302B may effectively be a copy of the local CDP log 302A. However, in other embodiments the remote CDP log 302B may store more information regarding the changes that have occurred to the data volume 300 than is stored in the local CDP log 302A. For example, in some embodiments the local CDP log 302A on the local host computer system 82 may be limited to a particular maximum size, e.g., due to limited storage capacity of the storage device (s) 125B on which the local CDP log 302A is stored. As change information accumulates in the local CDP log 302A, the local CDP log 302A may approach its maximum possible size. Thus, it may sometimes be necessary or desirable to delete some of the change information from the local CDP log 302A. In various embodiments, any desired criteria, heuristic, or algorithm may be used to select the change information to be deleted. As one example, older change information may be purged from the local CDP log 302A, and newer change information may be retained.

Whereas the storage capacity of the local host computer system 82 may be relatively limited, the server computer system 90 may have much more storage capacity. The server computer system 90 may, for example, be specifically designed to store a large amount of data received from various local host computer systems, e.g., to provide a remote backup service for the local host computer systems. For example, the server computer system 90 may maintain a pool of storage devices, each having a very large storage capacity. Thus, in a typical embodiment, the server computer system 90 may be able to store all of the data received from the local host computer system 82 in the remote CDP log 302B on one or more storage devices coupled to the server computer system 90, without needing to purge any of the data from the remote CDP log 302B even if it becomes very large. Thus, in a typical embodiment the remote CDP log 302B may either contain the same data as the local CDP log 302A, or may contain a superset of the data in the local CDP log 302A, e.g., the same data as the local CDP log 302A plus additional data.

Figure 3:
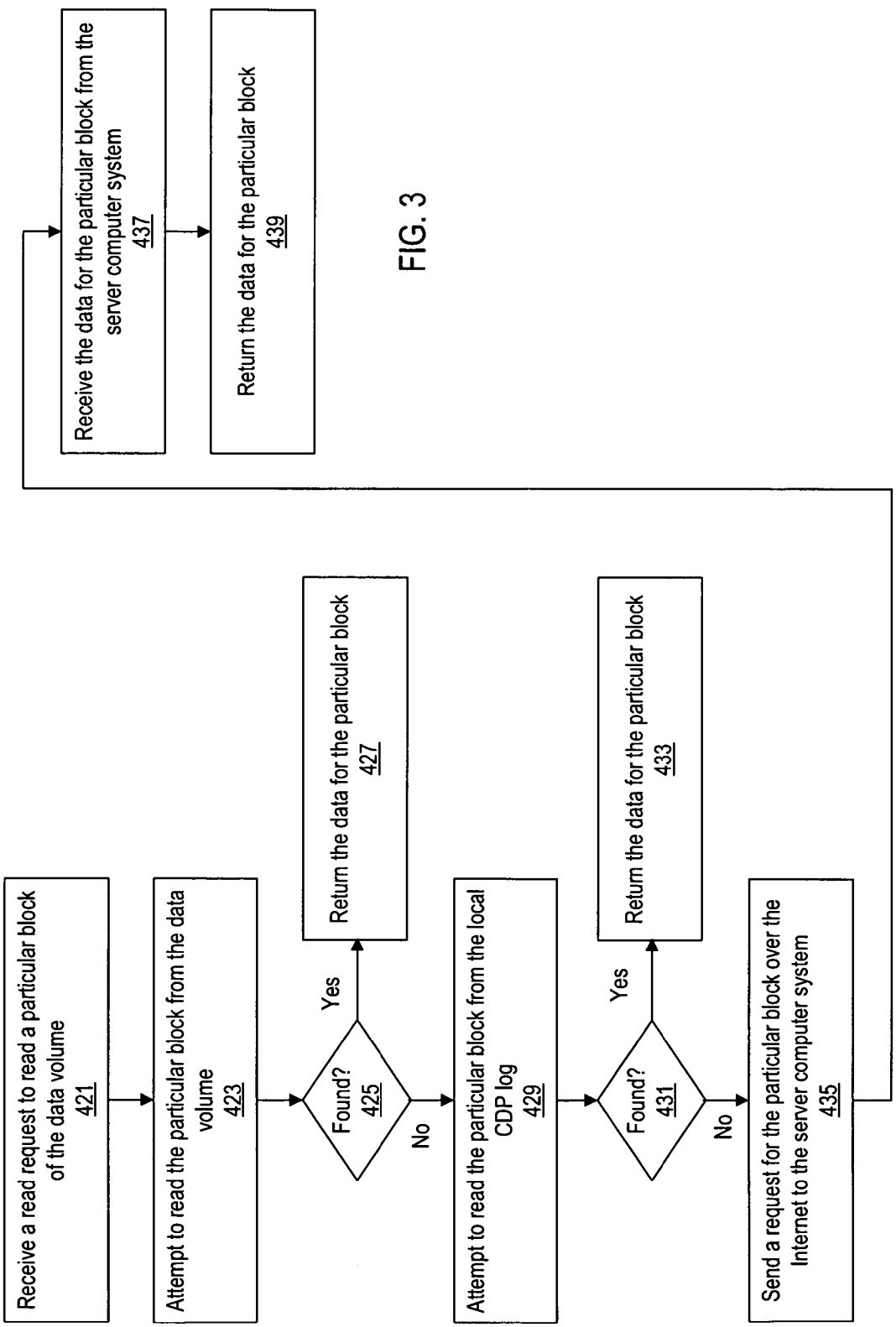
FIG. 3 is a flowchart diagram illustrating one embodiment of a method for reading from the data volume.

Referring now to FIG. 3, a flowchart diagram illustrating one embodiment of a method for reading from the data volume 300 is shown. The method of FIG. 3 may be implemented by the volume management and backup software 205 executing on the local host computer system 82. As indicated in block 421, the volume management and backup software 205 may receive a read request to read a particular block of the data volume 300. For example, the volume management and backup software 205 may receive the read request from a client application program executing on the local host computer system 82. In response, the volume management and backup software 205 may attempt to read the particular block from the data volume 300, as indicated in block 423.

Under normal circumstances, the block will be found in the data volume 300, and the volume management and backup software 205 then returns the data for the particular block to the client application, as indicated in blocks 425 and 427. However, in some cases the block may not be present in the data volume 300. For example, a failure may have previously occurred in which the data in the data volume 300 was lost.

If the block is not found in the data volume 300 then the volume management and backup software 205 may attempt to read the particular block from the local CDP log 302A, as indicated in 429. If the particular block is found in the local CDP log 302A then the volume management and backup software 205 returns the data for the particular block to the client application, as indicated in blocks 431 and 433. In some embodiments the volume management and backup software 205 may also store the data for the particular block in the data volume 300 so that a subsequent request for the same block can be satisfied by reading the block from the data volume 300 without needing to read the block from the local CDP log 302A again.

However, in some situations the particular block may not be present in the local CDP log 302A either. For example, the local CDP log 302A may have been lost in a failure in addition to the data volume 300 being lost. As another example, some of the blocks may have previously been deleted from the local CDP log 302A in order to save storage space, similarly as discussed above.

If the particular block is not found in the local CDP log 302A then the volume management and backup software 205 may send a request for the particular block over the Internet to the server computer system 90, as indicated in block 435. In response to the request the server computer system 90 may read the particular block from the remote CDP log 302B and transmit the block data to the local host computer system 82. The volume management and backup software 205 on the local host computer system 82 may receive the data for the particular block from the server computer system 90 and return the data to the client application, as indicated in blocks 437 and 439. In some embodiments the volume management and backup software 205 may also store the block data in the data volume 300, and possibly the local CDP log 302A as well. (The server computer system 90 may also transmit the timestamp information for the block along with the block data so that the timestamp information can be stored in the local CDP log 302A in association with the block data.)

Thus, in the event of a failure in which both the data volume 300 and the local CDP log 302A are lost, the data volume 300 can be restored by requesting its blocks from the remote computer server 90. In this manner, the Internet may effectively be treated as a virtual storage device by directing read requests for particular blocks of the data volume 300 to the remote computer server 90 on the Internet. In various embodiments this may be advantageous because the blocks of the data volume 300 are replicated remotely in the remote CDP log 302B on the server computer system 90, which may provide increased data protection and redundancy for the data volume 300.

In various embodiments the system described above may also be advantageous because the client applications that use the data volume 300 may not have to wait for a restore operation to perform a full restore of the data volume 300 after a failure of the data volume 300 and the local CDP log 302A have occurred. For example, even after the failure has occurred the client applications may continue to send read requests for blocks of the data volume 300 to the volume management and backup software 205. The volume management and backup software 205 may satisfy the read requests in real time by retrieving the specified blocks of the data volume 300 from the server computer system 90. As each block is retrieved, the block may also be stored in a new version of the data volume 300 in order to gradually rebuild the data volume 300. (In parallel with the client applications, the local host computer system 82 may also execute restore software to restore all of the data to the new version of the data volume 300 by retrieving all the blocks of the data volume 300 from the server computer system 90.) Thus, the client applications may experience a slight delay due to the network latency involved in transmitting the blocks over the Internet, but there may not be significant downtime due to total unavailability of the data volume.

In addition, the system may provide for greater flexibility in restoring the data volume 300 to previous points in time. For example, whereas the storage space available locally on the local host computer system 82 may be relatively limited, the server computer system 90 may effectively serve as a virtual storage device with a greater amount of available storage space. As discussed above, this may allow greater amounts of change data for the data volume 300 to be stored in the remote CDP log 302B than can be stored in the local CDP log 302A. Thus, for example, the system may enable the data volume 300 to be restored to time points for which corresponding block information is no longer available in the local CDP log 302A, e.g., due to having been purged to save storage space.

Figure 4:
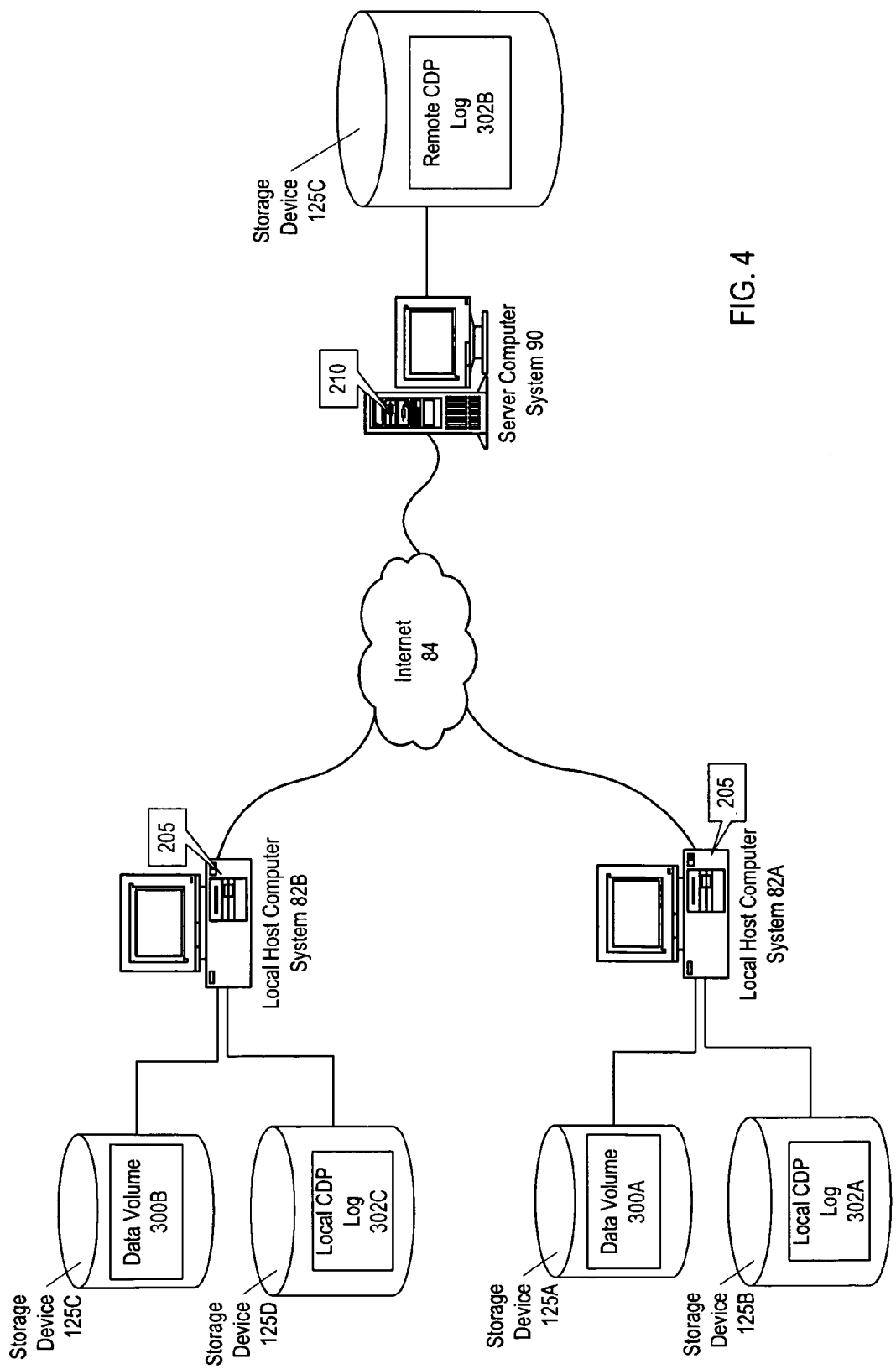
FIG. 4 illustrates an embodiment in which the system includes a first local host computer system and a second local host computer system, where a copy of a data volume maintained by the first local host computer system is created on the second local host computer system.

FIG. 4 illustrates an embodiment in which the system includes a first local host computer system 82A and a second local host computer system 82B. The second local host computer system 82B may be located in a different geographic location than the first local host computer system 82A, e.g., in different data centers, different cities, or even different countries.

The local host computer system 82A may operate to write data to a first copy 300A of a data volume. Similarly as described above, each write request to write a particular block of the data volume 300A may cause the block to be updated in the data volume 300A itself, as well as a copy of the block and timestamp information being stored in the local CDP log 302A on the local host computer system 82A and in the remote CDP log 302B on the server computer system 90.

Suppose now that it is necessary or desirable to restore the data volume 300A to the local host computer system 82B or create a copy of the data volume 300A on the local host computer system 82B. The local host computer system 82B may execute restore software which first creates an empty copy 300B of the data volume and an empty local CDP log 302C on the local host computer system 82B. The restore software may then request all of the blocks for the data volume from volume management and backup software 205 executing on the local host computer system 82B. Since the requested blocks are not yet present in either the copy 300B of the data volume or the local CDP log 302C, the volume management and backup software 205 may retrieve the blocks from the server computer system 90 via the Internet, similarly as described above.

Thus, in some embodiments the system may enable a copy of a data volume originally created and stored on one local host computer system to be created on virtually any other local host computer system in the world with Internet access. The local host computer system on which it is desired to create the copy of the data volume simply needs to execute the volume management and backup software 205 which communicates with the server computer system 90 through the Internet in order to request the blocks of the data volume.

In addition to creating a copy of the data volume as it exists in its most recent state, in some embodiments the system may also be used to restore the data volume as it existed at previous points in time to the local host computer system 82B in FIG. 4. This may be useful, for example, for data mining purposes. For example, it may be desirable to perform data mining in order to analyze the volume data as it existed at a particular time in the previous week. Thus, a user of the local host computer system 82B may simply input the desired time point to a data mining application executing on the local host computer system 82B. The data mining application may then request the blocks of the volume from the volume management and backup software 205 on the local host computer system 82B, e.g., where the read requests include the time information specified by the user. After finding that the blocks are not available locally, the volume management and backup software 205 may request the blocks from the server computer system 90, passing along the time information specified by the user. The remote storage software 210 executing on the server computer system 90 may use the specified time information to retrieve the appropriate copy of each block of the volume from the remote CDP log 302B, e.g., whichever copy represents the state of the block as it existed at the specified time.

Figure 5:
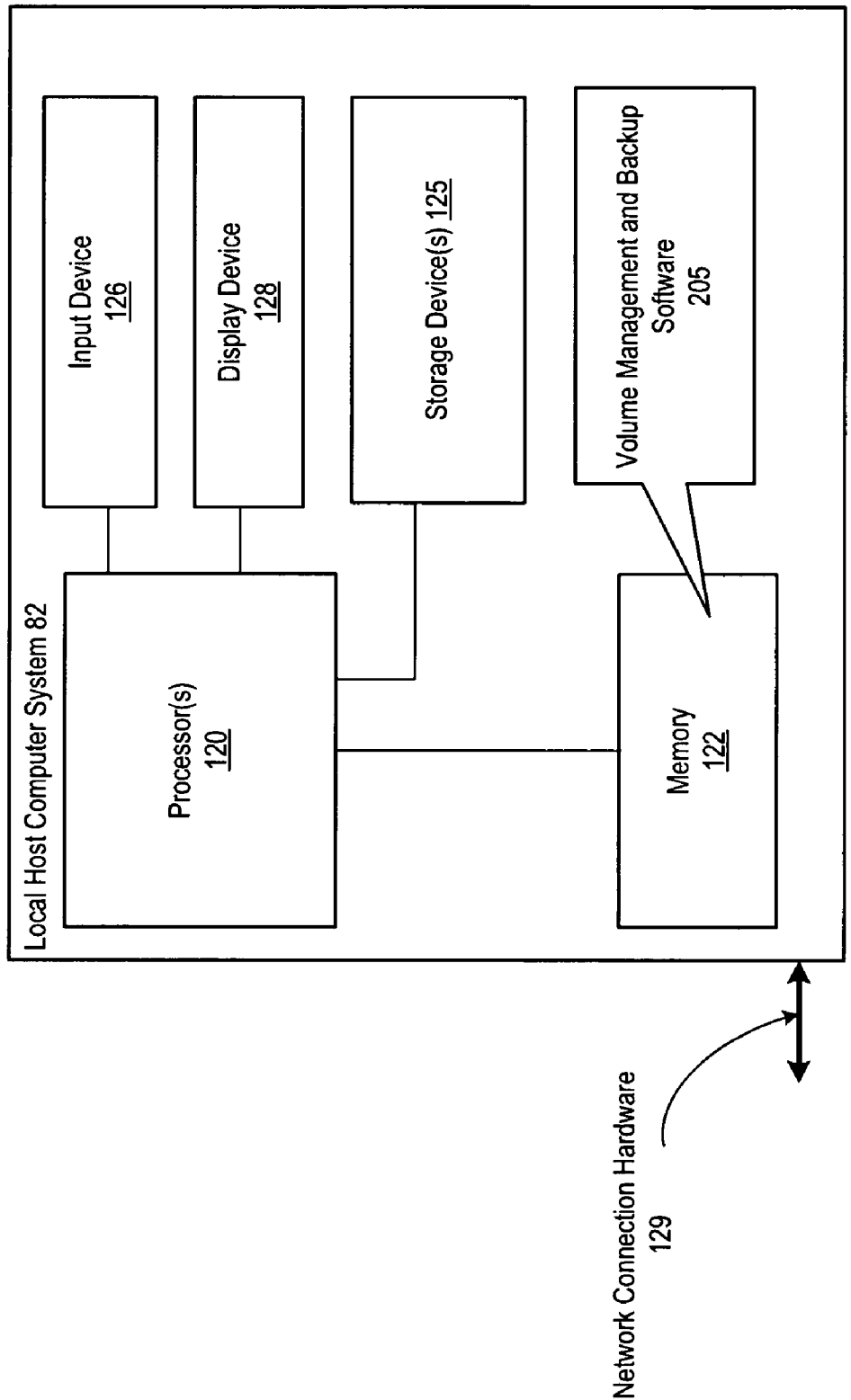
FIG. 5 illustrates an example of a local host computer system according to one embodiment.

In various embodiments, the local host computer system 82 and the server computer system 90 described herein may each include any type of computing devices or other hardware devices. FIG. 5 illustrates an example of the local host computer system 82 according to one embodiment. In this example, the local host computer system 82 includes a processor 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store the volume management and backup software 205. The volume management and backup software 205 may be executable by the processor 120 to perform the functions described above. The memory 122 may also store other software which operates in conjunction with or which is used by the volume management and backup software 205, such as operating system software, file system software, network communication software, device management software, client application software, etc.

In various embodiments the volume management and backup software 205 may be implemented in any of various ways and may have any desired software architecture. For example, in some embodiments the volume management and backup software 205 may be implemented as a single software program. In other embodiments the volume management and backup software 205 may be implemented as two or more software programs or modules that operate in conjunction with each other. For example, in some embodiments various functions described herein may be implemented by different modules. For example, in some embodiments the volume management and backup software 205 may include a first module operable to perform the functions associated with reading blocks from and writing blocks to the data volume 300; a second module operable to perform the functions associated with reading information and writing information to the local CDP log 302A; and a third module operable to perform the functions associated with transmitting information to and receiving information from the server computer system 90.

Referring again to FIG. 5, it is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments the local host computer system 82 may include multiple processors 120.

The local host computer system 82 may also include or may be coupled to one or more storage devices 125 on which the data volume 300 and the local CDP log 302A are stored. In various embodiments the storage devices 125 may include any of various kinds of storage devices, such as disk drive devices, optical storage devices, tape storage devices, flash memory storage devices, etc. In one embodiment, the storage devices 125 may include one or more disk drives configured as a disk storage system. In one embodiment, the disk storage system may be an example of a redundant array of inexpensive disks (RAID) system. In another embodiment, the disk storage system may be a disk array, or Just a Bunch Of Disks (JBOD) (used to refer to disks that are not configured according to RAID). In yet other embodiments, the storage devices 125 may include RAM disks, for example.

In various embodiments the one or more storage devices 125 may be coupled to the local host computer system 82 in any of various ways, such as direct attached storage, fiber channel storage, storage area network (SAN) storage, iSCSI storage, etc. In some embodiments the local host computer system 82 may communicate with the one or more storage devices 125 through a network.

The local host computer system 82 may also include one or more input devices 126 for receiving user input from a user of the local host computer system 82. The input device(s) 126 may include any of various types of input devices, such as keyboards, keypads, microphones, or pointing devices (e.g., a mouse or trackball). The local host computer system 82 may also include one or more output devices 128 for displaying output to the user. The output device(s) 128 may include any of various types of output devices or display devices, such as LCD screens or monitors, CRT monitors, etc.

The local host computer system 82 may also include network connection hardware 129 through which the local host computer system 82 connects to the network 84, e.g., in order to transmit information to and receive information from the server computer system 90. The network connection hardware 129 may include any type of hardware for coupling the local host computer system 82 to the network, e.g., depending on the type of network. In various embodiments, the local host computer system 82 may connect to the server computer system 90 through any type of network or combination of networks. For example, the network may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks. Also, the local host computer system 82 and the server computer system 90 may each be coupled to the network using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

Figure 6:
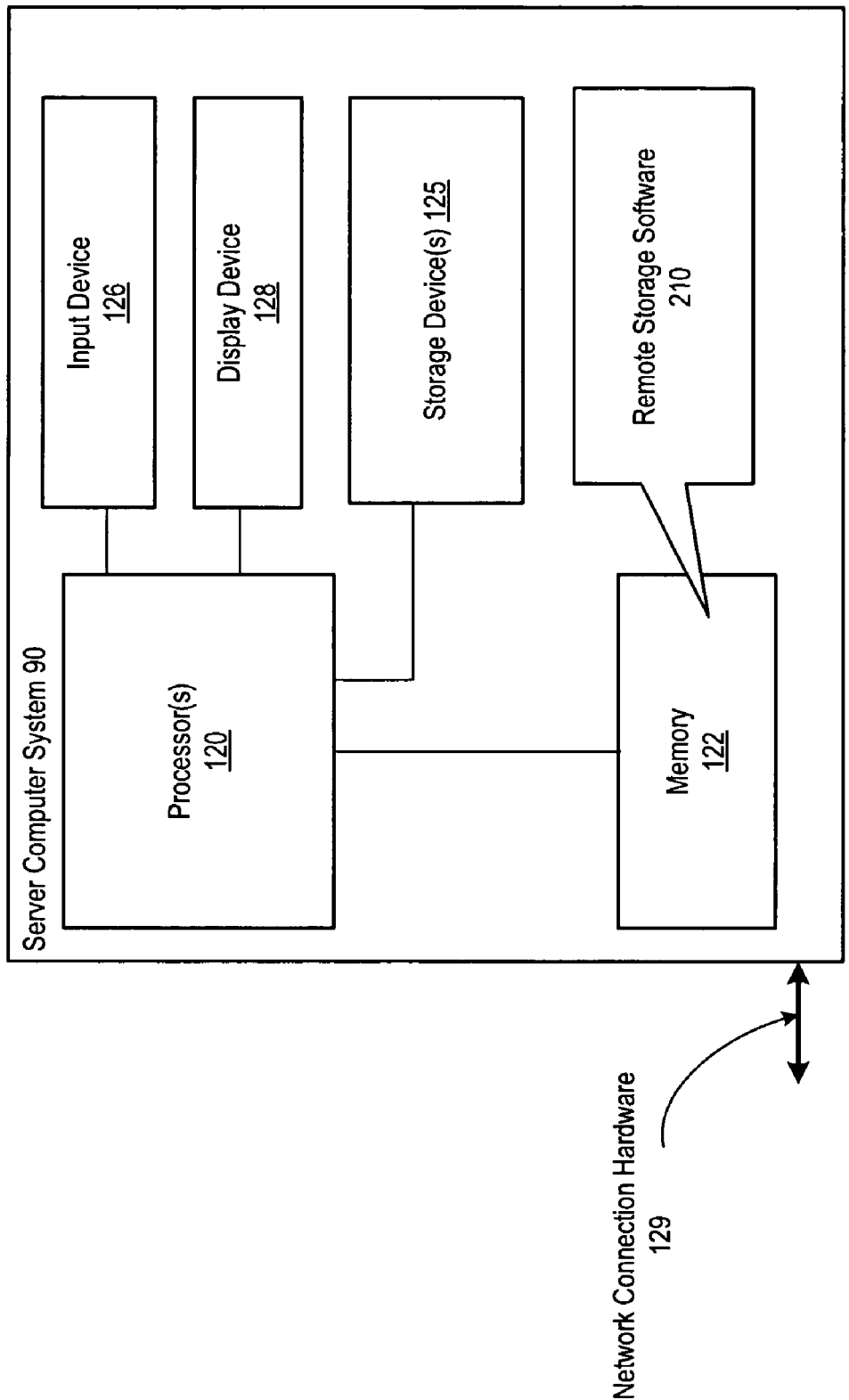
FIG. 6 illustrates an example of a server computer system according to one embodiment.

FIG. 6 illustrates an example of the server computer system 90 according to one embodiment. The server computer system 90 may include similar components as those described above with reference to FIG. 5. However, in this case the memory 122 stores remote storage software 210. The remote storage software 210 is executable by the processor(s) 120 to perform various functions described above with reference to the server computer system 90, such as writing information to and reading information from the remote CDP log 302B in response to requests from the local host computer system 82. The memory 122 may also store other software which operates in conjunction with or which is used by the remote storage software 210, such as operating system software, file system software, network communication software, device management software, etc.

In various embodiments the remote storage software 210 may be implemented in any of various ways and may have any desired software architecture. For example, in some embodiments the remote storage software 210 may be implemented as a single software program. In other embodiments the remote storage software 210 may be implemented as two or more software programs that operate in conjunction with each other.

The remote CDP log 302B may be stored on one or more storage devices 125 included in or coupled to the server computer system 90. Similarly as described above, the storage devices 125 may include any of various kinds of storage devices, such as disk drive devices, optical storage devices, tape storage devices, flash memory storage devices, etc. In some embodiments the server computer system 90 may communicate with the one or more storage devices on which the remote CDP log 302B is stored through a network.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A tangible, non-transitory computer-accessible storage medium storing program instructions executable to:
   in response to a first request to read a particular block of a data volume, attempt to read the particular block from the data volume;
   in response to determining that the particular block is not present in the data volume, attempt to read the particular block from a first continuous data protection (CDP) log for the data volume;
   in response to determining that the particular block is not present in the first CDP log, send a second request for the particular block over a network to a server computer system; and
   receive the particular block from the server computer system.

2. The tangible, non-transitory computer-accessible storage medium of claim 1,
   wherein the program instructions are executable by a first computer system, wherein the server computer system is coupled to the first computer system via the Internet;
   wherein sending the second request for the particular block comprises sending the second request over the Internet to the server computer system.

3. The tangible, non-transitory computer-accessible storage medium of claim 1,
   wherein the first request specifies a time;
   wherein the first request comprises a first request for data of the particular block as the particular block existed in the data volume at the specified time;
   wherein the second request includes the specified time;
   wherein the second request comprises a second request for the data of the particular block as the particular block existed in the data volume at the specified time; and
   wherein receiving the particular block comprises receiving the data of the particular block as the particular block existed in the data volume at the specified time.

4. The tangible, non-transitory computer-accessible storage medium of claim 1, wherein in response to a third request to write the particular block to the data volume, the program instructions are further executable to:
   store the particular block in the data volume;
   store the particular block in the first CDP log for the data volume; and
   transmit the particular block over the network for storage on the server computer system.

5. The tangible, non-transitory computer-accessible storage medium of claim 4,
   wherein said transmitting the particular block over the network for storage on the server computer system is performed as a synchronous operation with respect to said storing the particular block in the first CDP log, such that the program instructions are executable to wait for an acknowledgement to the transmission before returning an indication that storing the particular block in the first CDP log was completed.

6. The tangible, non-transitory computer-accessible storage medium of claim 4,
   wherein said transmitting the particular block over the network for storage on the server computer system is performed as an asynchronous operation with respect to said storing the particular block in the first CDP log, such that the program instructions are executable to return an indication that storing the particular block in the first CDP log was completed without waiting for an acknowledgement to the transmission.

7. A computer-implemented method comprising:
   in response to a first request to read a particular block of a data volume, a first computer system attempting to read the particular block from the data volume;
   in response to determining that the particular block is not present in the data volume, the first computer system attempting to read the particular block from a first continuous data protection (CDP) log for the data volume;
   in response to determining that the particular block is not present in the first CDP log, the first computer system sending a second request for the particular block over a network to a server computer system; and
   the first computer system receiving the particular block from the server computer system.

8. The computer-implemented method of claim 7,
   wherein sending the second request for the particular block comprises, sending the second request over the Internet to the server computer system.

9. The computer-implemented method of claim 7,
   wherein the first request specifies a time;
   wherein the first request comprises a first request for data of the particular block as the particular block existed in the data volume at the specified time;
   wherein the second request includes the specified time;
   wherein the second request comprises a second request for the data of the particular block as the particular block existed in the data volume at the specified time; and wherein receiving the particular block comprises receiving the data of the particular block as the particular block existed in the data volume at the specified time.

10. The computer-implemented method of claim 7, further comprising:
the first computer system receiving a third request to write the particular block to the data volume;
in response to the third request:
storing the particular block in the data volume;
storing the particular block in the first CDP log for the data volume; and
transmitting the particular block over the network for storage on the server computer system.

11. The computer-implemented method of claim 10, wherein said transmitting the particular block over the network for storage on the server computer system is performed as a synchronous operation with respect to said storing the particular block in the first CDP log by waiting for an acknowledgement to the transmission before returning an indication that storing the particular block in the first CDP log was completed.

12. The computer-implemented method of claim 10, wherein said transmitting the particular block over the network for storage on the server computer system is performed as an asynchronous operation with respect to said storing the particular block in the first CDP log by returning an indication that storing the particular block in the first CDP log was completed without waiting for an acknowledgement to the transmission.

13. A system comprising:
a first computer system configured to:
receive a write request to write a particular block to a data volume;
in response to the write request:
store the particular block in a first copy of the data volume;
store the particular block in a first continuous data protection (CDP) log for the first copy of the data volume;
transmit the particular block over a network for storage on a server computer system; and
a second computer system configured to:
in response to a read request to read the particular block of the data volume, attempt to read the particular block from a second copy of the data volume;
in response to determining that the particular block is not present in the second copy of the data volume, attempt to read the particular block from a second CDP log for the second copy of the data volume;
in response to determining that the particular block is not present in the second CDP log, send a request for the particular block to the server computer system;
receive the particular block from the server computer system.

14. The system of claim 13,
wherein the first computer system is coupled to the server computer system via the Internet;
wherein transmitting the particular block for storage on the server computer system comprises the first computer system transmitting the particular block over the Internet to the server computer system;
wherein the second computer system is coupled to the server computer system via the Internet;
wherein sending the request for the particular block to the server computer system comprises the second computer system sending the request for the particular block over the Internet to the server computer system.

15. The system of claim 13,
wherein, in response to the write request, the first computer system is further configured to:
determine a current time; and
store timestamp information specifying the time in the first CDP log in association with the particular block; and
transmit the timestamp information over the network for storage on the server computer system in association with the particular block.

* * * * *